United States Patent [19]
Gilbert et al.

[11] 3,730,030
[45] May 1, 1973

[54] AUTOMATIC LATHES
[75] Inventors: Harold James Gilbert, Coventry; Reginald John Dixon, Solihull, both of England
[73] Assignee: Wickman Machine Tool Sales Limited, Coventry, England
[22] Filed: Nov. 14, 1969
[21] Appl. No.: 876,956

[52] U.S. Cl. ............................82/21 R, 82/19, 82/24
[51] Int. Cl. ...........................................B23b 21/00
[58] Field of Search............................82/21, 19, 24

[56] References Cited

UNITED STATES PATENTS

| | | | |
|---|---|---|---|
| 3,203,287 | 8/1965 | Bergonzo | 82/21 |
| 3,245,290 | 4/1966 | Johansson | 82/19 X |
| 2,426,458 | 8/1947 | Kuffler | 82/19 |

FOREIGN PATENTS OR APPLICATIONS

| | | | |
|---|---|---|---|
| 743,338 | 9/1966 | Canada | 82/19 |
| 1,013,613 | 12/1965 | Great Britain | 82/19 |

Primary Examiner—Leonidas Vlachos
Attorney—Holman and Stern

[57] ABSTRACT

An automatic machine having a plurality of tool carrying slides, one of the slides being controlled by a cam comprising a rotatable member mounted upon a driving shaft, and at least one part adjustably mounted upon the rotatable member, said part having cam forming edges, the distance of which from the axis of rotation of the shaft varies with the adjusted position of the part on the member, and a cam follower connecting the slide with the cam.

7 Claims, 3 Drawing Figures

AUTOMATIC LATHES

BACKGROUND OF THE INVENTION

This invention relates to automatic machines such as single or multi spindle lathes,, of the kind including one or more work spindles and one or more tool slides which, during operation of the machine is, or are, advanced towards and subsequently withdrawn from the vicinity of a workpiece or of workpieces rotatably supported on the machine in one chuck or in respective chucks, with the advance and return movements of the tool slide, or slides, being controlled by a rotatable cam, or by respective rotatable cams, driven by power means on the machine. The, or each, tool slide is movable either transversely with respect to the chuck axis or axes, or lengthwise of said axis or axes. Tool slide stroke comprises a fast approach, a slower feed, a dwell and a fast return movement. Such a machine will, for convenience, be referred to as being of the kind specified.

The object of the invention is to provide a machine of the kind specified in a convenient form enabling adjustments of the strokes of the tool slides, or slide, to be readily carried out.

SUMMARY OF THE INVENTION

In accordance with the present invention, an automatic machine of the kind specified in characterized in that one or more of the cams for controlling tool slide movement comprises a rotatable member mounted upon a driving shaft, at least one part adjustably securable to the member, said part having at least one operative cam forming edge, with adjustment of said member varying the distance of said edge with respect to the axis of rotation of the member, and a cam follower connected to the associated slide and arranged to engage said cam forming edge.

BRIEF DESCRIPTION OF THE DRAWINGS

The invention will now be described by way of example with reference to the accompanying drawings in which.

DETAILED DESCRIPTION OF THE DRAWINGS

Figure 1:
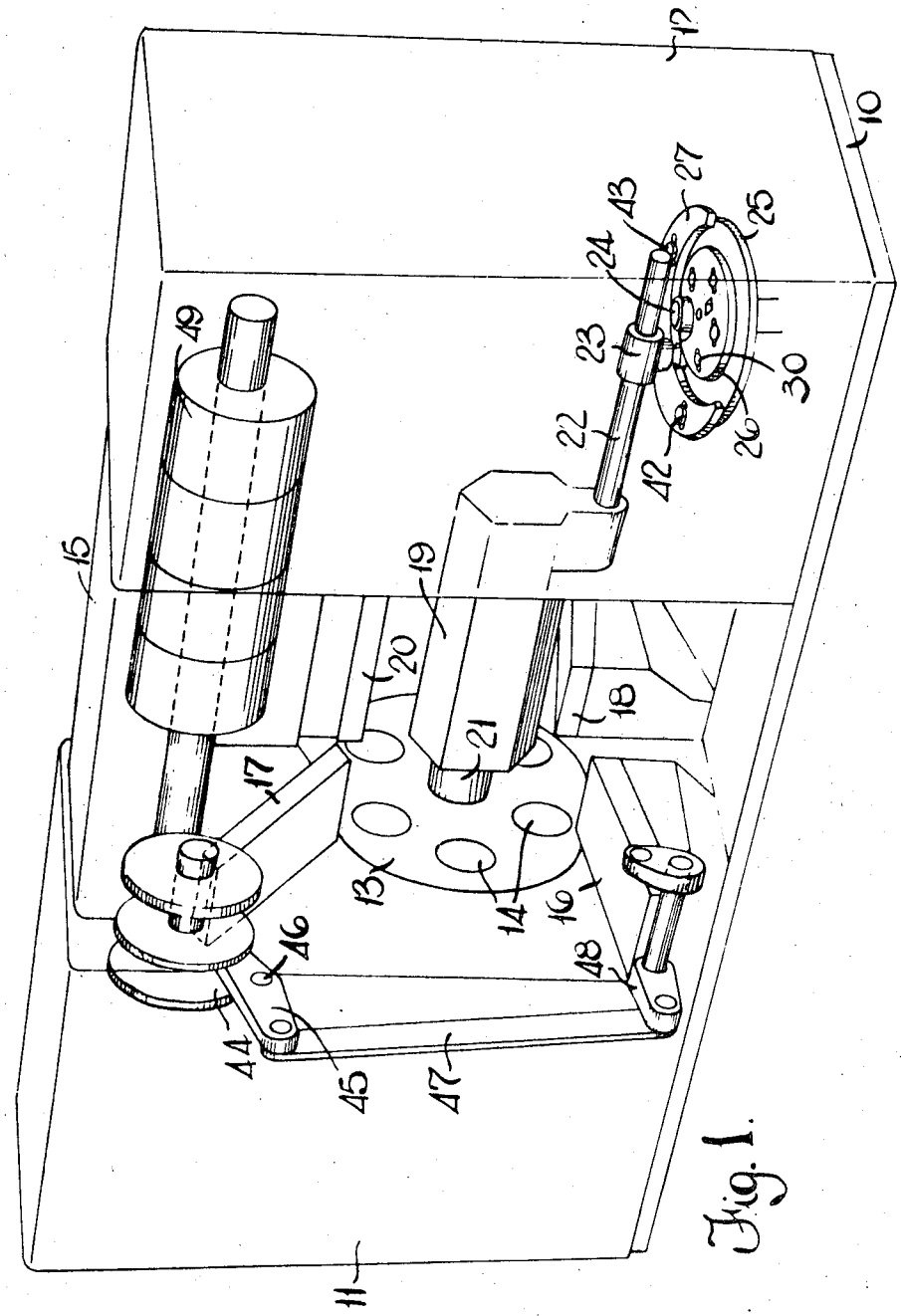
FIG. 1 is a diagrammatic small scale perspective view of a machine incorporating the present invention.

The machine illustrated in FIG. 1 is a multi-spindle automatic lathe having a base 10 at opposite ends of which are respective upstanding superstructures 11 and 12. The superstructure 11 carries a spindle drum indicated at 13. This spindle drum has multiple work spindles mounted on respective parallel axes, each work spindle being independently rotatable and the spindle drum 13 being indexable between successive positions so that successive operations can be carried out on workpieces held in respective chucks on the work spindles.

The superstructure 12, as well as a bridge structure 15 extending between the tops of the superstructures 11 and 12, contain mechanisms for operating tool slides on the machine.

The machine illustrated has four transversely movable tool slides three of which are illustrated at 16, 17 and 18. There is also a tool block 19 which is movable lengthwise of the machine in a direction which is parallel to the spindle axes. A further longitudinally movable slide 20 is also illustrated on this machine.

The block 19 is mounted upon a fixed shaft 21 mounted at one end in the superstructure 11 through the center of the spindle drum 13 and in the superstructure 12 at the other end.

The tool slides 16, 17, 18, 19 and 20 are moved towards and away from workpieces in the chucks in accordance with a predetermined cycle which is automatically controlled and for convenience the mechanism which controls the movement of the block 19 will now be described.

The block 19 carries, at its end remote from the spindle drum 13, a horizontal bar 22, the axis of which is parallel to the shaft 21. The bar 22 is slidable in bearings in the superstructure 12 and within this superstructure a cam follower 23 is connected to the bar 22. The cam follower 23 comprises a sleeve clamped to the bar 22 and a roller mounted upon a downwardly extending spindle.

The cam follower 23 engages in a cam mounted upon a vertical shaft 24. A driving mechanism (not illustrated) is connected to the shaft 24 whereby it is rotated when the machine is in operation in timed relationship with the machine cycle.

The cam is formed of three parts comprising a disc member 25 mounted on the shaft 24, and a pair of cam parts 26 and 27 mounted adjustably thereon.

Figure 2:
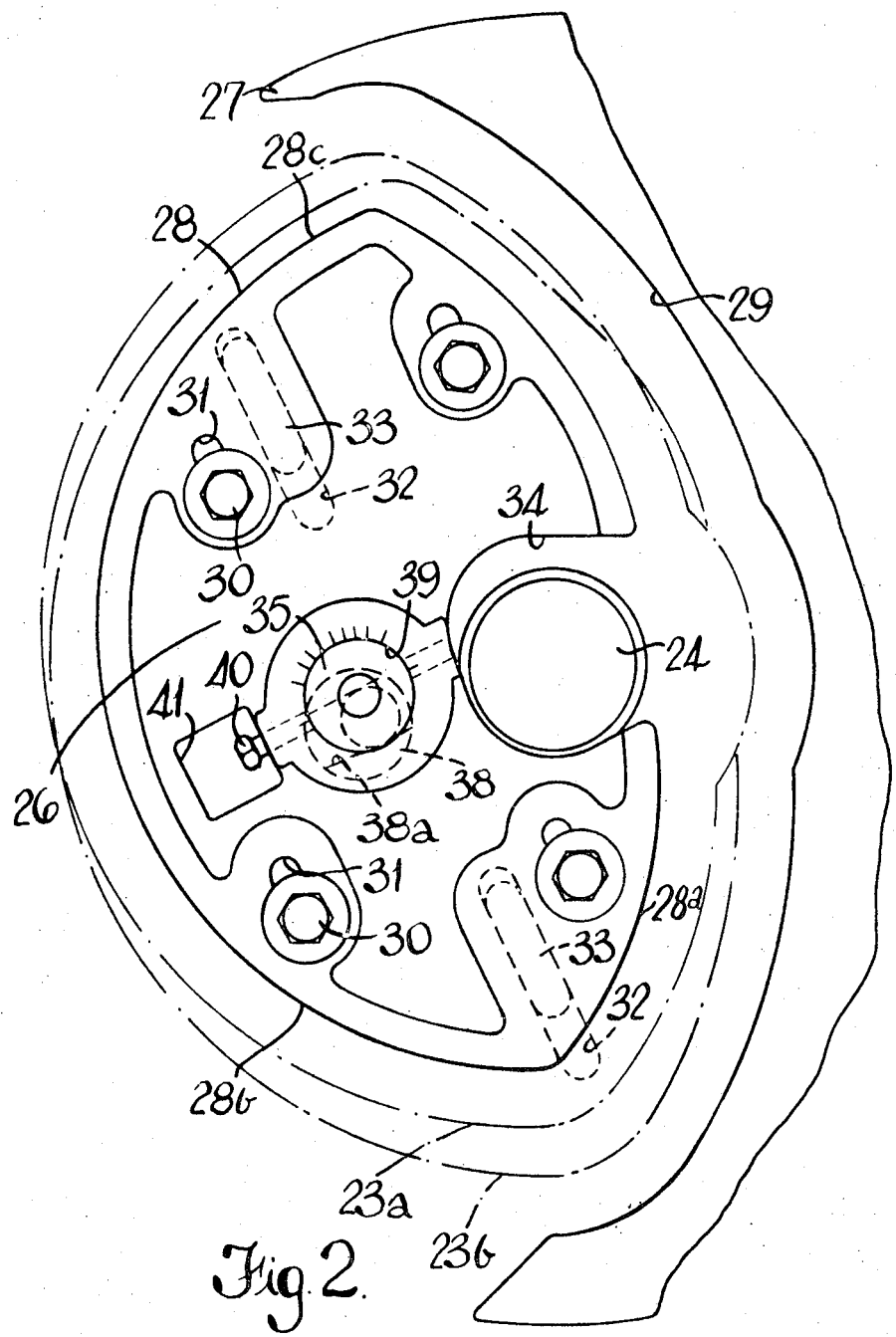
FIG. 2 is a view of a cam in the machine.
Figure 3:
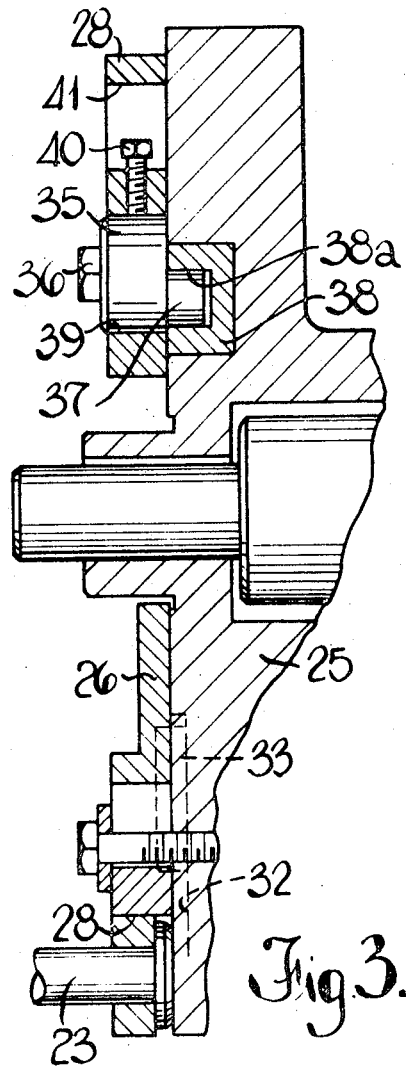
FIG. 3 is a cross-sectional view of the cam in FIG. 2.

As seen from FIGS. 2 and 3, the part 26 is shaped to provide an operative edge 28 against which the cam follower engages to cause the block 19 to travel towards the chucks. Initial movement from a retracted position is fast and is controlled by a portion 28a of the edge 28. The block slows to provide for tool feed during operation under the control of a portion 28b. The part 27 partially surrounds the part 26 and is formed with an operative edge 29 with which the cam follower 23 engages during the return stroke of the block 19. The edge 28 has a further portion 28c which provides for a dwell in which no movement of the block 19 takes place during a predetermined angular travel of the cam.

The part 26, as illustrated in FIGS. 2 and 3, is secured to the member 25 by bolts 30 engaging in respective slots 31 in the part 26. There are four bolts 30 and four slots 31 have their longitudinal axes parallel. To guide the movement of the part 26 with respect to the member 25, the member 25 has two further slots 32 in its upwardly presented surface against which the part 26 engages, and the part 26 carries a pair of tenons 33 engaging in the slots respectively. The slots 32 have their axes parallel to the axes of the slots 31. The slots 32 are, furthermore, longer than tenons 33 engaging therein. The portion of the surface 28 of the part 26 which controls the dwell is substantially normal with respect to the slot axes, so that when adjustment of the cam takes place, there will always be the same dwell period during the operating cycle.

The part 26 has a shaped cut-out 34 through which the shaft 24 extends, the cut-out 34 being shaped to enable the part 26 to be moved relatively to the shaft 24 within limits dictated by the length of the slots 31 and 32.

To control the sliding movement of the part 26 with respect to the member 25 there is a cam mechanism mounted between the part 26 and the member 25. The cam mechanism comprises a cylindrical part 35 having an integral upstanding hexagonal portion 36, the center of which coincides with the center of the cylinder. The opposite side of the cylinder of the member 35, however, has an off-set cylindrical extension 37 engaging in a slot 38a in a bearing bushing 38 in the member 25. The slot 38a extends normally to the axes of the tenons 33.

The cylinder of the part 35 engages in a cylindrical socket 39 in the part 26, and is locked therein in any chosen angular position by means of a bolt 40 accessible through an opening 41 in the part 26.

In order to adjust the part 26 relatively to the member 25, the bolt 40 is slackened and the part 35 is rotated by means of its hexagonal portion 36. Since rotation takes place about the extension 37 of the part 35, the part 26 will be moved between the limits determined by the slots 31 and 32, and by the degree of eccentricity of the part 35.

The extreme possible paths of travel of the center of the cam follower 23 with respect to the edges 28, 29 are indicated by lines 23a and 23b respectively in FIG. 2. The cam edges are so shaped that at the angular setting of the part 35 which is illustrated the maximum stroke of the block 19 will be achieved. In this example, this corresponds to a 55 mm. stroke.

Minimum stroke of the block 19 is indicated by the line 23b. In this example, the minimum stroke is 5 mm.

The part 27 is also adjustable relatively to the member 25 in similar manner to that described in relation to the part 26. In FIG. 1, the bolts securing the part 27 to the member 25 are indicated at 42 and the cam mechanism is indicated at 43.

In the machine illustrated in FIG. 1, the slides 16, 17 and 18 are also controlled by means of respective cams 44 in the bridge portion of the machine 15, with these cams 44 being mounted upon shafts extending horizontally through the bridge 15. The cams 44 are each provided with adjustable parts similar to the parts 26 and 27 on the cam controlling the block 19.

The cam followers on the cams 44 carry respective linkages to the appropriate slides and such a linkage is illustrated in respect of slide 16. This linkage comprises a cam follower arm 45 which is pivotally mounted at 46 on the machine within the superstructure 11. The end of this arm 45, remote from the cam 44, is pivotally connected to a link 47 which in turn is connected through a bell crank lever 48 to the slide 16.

If it is desired to produce longer or shorter strokes of any slide, than can be achieved with the adjustable cam which is shown, and the cam can be changed for another in which the appropriate adjustment range is provided.

The particular machine illustrated also includes cam drums 49 mounted within the superstructure 12 and the bridge 15. These are of conventional form and provide a fixed stroke for the slide 20 and for other slides mounted upon the machine (not illustrated).

The drawings show the shaft on which the disc member 25 is mounted to be vertical. However, it can be mounted upon an axis which is horizontal or otherwise. In some variants of the machine, the block 19 is connected with the cam follower 23 through an intermediate linkage.

Further parts may be provided on the disc member to define further cam edges as may be required to control the associated block 19. For example, the part 27 may be formed as two separate and independently adjustable parts.

It is to be understood that the invention can also be applied to single spindle automatic lathes, drilling machines or other types of automatic machines.

The cam 27 may be omitted, with the return motion of the slide being controlled by springs or hydraulic means.

Alternatively, part of cam 27 only is provided and a separate return cam is used in association with a second cam follower secured to the bar 22 to ensure the initial return of the slide from its maximum forward position.

The slides of the constructions herein described are intended to carry tools but these may alternatively carry workpieces movable relatively to tools.

Having thus described our invention what we claim as new and desire to secure by Letters Patent is:

1. An automatic lathe having multi-work spindles and at least one tool block to carry tools for carrying out machining operations on work spieces, said tool block moving lengthwise of the spindles and being controlled by a rotatable cam driven by power means on the lathe, the cam for controlling movement of the tool block comprising, a member mounted upon a driving shaft for rotation about an axis which is perpendicular to the direction of travel of the tool block, at least one part adjustably securable to the member, said part being adjustable relatively to the member in a plane parallel to the direction of travel of the tool block, said part having at least one operative cam defining edge, adjustment of said member varying the distance of said edge with respect to the axis of rotation of the member, and a cam follower rigidly connected to the associated tool block and arranged to engage said cam defining edge, means whereby relative adjustment between the member and said part can be carried out, said adjustment means comprising a component pivotally mounted on the member, the component being engaged in an opening in the part which is adjustably securable to the member, the component having means whereby it can be rotated to cause relative movement between the member and said part, said part carrying locking means whereby the component can be locked therein against against rotation, and at least one further part adjustably secured to the member, said further part of parts having cam forming edges which the cam follower engages.

2. The automatic lathe as claimed in claim 1 in which the eccentric means includes an eccentric part pivotally mounted on the member, the eccentric part being engaged in an opening in the part which is adjustably securable to the member, the eccentric part having means whereby it can be rotated to cause relative movement between the member and said part.

3. The automatic lathe as claimed in claim 2 in which the part carries locking means whereby the eccentric part can be locked therein against rotation.

4. An automatic lathe having a multi-work spindle and at least one tool block to carry tools for carrying out machining operations on work pieces, the tool block being controlled by a rotatable cam driven by power means on the lathe, the cam for controlling movement of the tool block comprising, a member mounted upon a driving shaft for rotation about an axis which is perpendi-cular to the direction of travel of the tool block, at least one part adjustably securable to the member, said part being adjustable relatively to the member in a plane parallel to the direction of travel of the tool block, said part having at least one operative cam defining edge, adjustment of said member varying the distance of said edge with respect to the axis of rotation of the member, a cam follower rigidly connected to the associated tool block and arranged to engage said cam defining edge, eccentric means whereby relative adjustment between the member and said part can be carried out, the eccentric means including an eccentric part pivotally mounted on the member, the eccentric part being engaged in an opening in the part which is adjustably securable to the member, the eccentric part having means whereby it can be rotated to cause relative movement between the member and said part, the part carrying locking means whereby the eccentric part can be locked therein against rotation, and at least one further part adjustably secured to the member, said further part or parts having cam forming edges which the cam follower can engage.

5. The automatic lathe as claimed in claim 4 having eccentric means whereby relative adjustment between the member and said further part or parts can be carried out.

6. The automatic lathe as claimed in claim 5 in which the eccentric means for the or each further part includes an eccentric part pivotally mounted on the member, the eccentric part being engaged in an opening in the further part, which is adjustably securable to the member, the eccentric part having means whereby it can be rotated to cause relative movement between the member and said further part.

7. The automatic lathe as claimed in claim 6 in which the further part carries locking means whereby the eccentric part can be locked therein against rotation.

* * * * *